(12) United States Patent
Kitayama

(10) Patent No.: US 10,891,091 B2
(45) Date of Patent: Jan. 12, 2021

(54) IMAGE-FORMING APPARATUS AND IMAGE-FORMING METHOD

(71) Applicant: SHARP KABUSHIKI KAISHA, Sakai (JP)

(72) Inventor: Katsuya Kitayama, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/597,090

(22) Filed: Oct. 9, 2019

(65) Prior Publication Data
US 2020/0125307 A1 Apr. 23, 2020

(30) Foreign Application Priority Data
Oct. 18, 2018 (JP) .................................. 2018-196902

(51) Int. Cl.
*G06F 3/12* (2006.01)
(52) U.S. Cl.
CPC .......... *G06F 3/1256* (2013.01); *G06F 3/1204* (2013.01); *G06F 3/1207* (2013.01)
(58) Field of Classification Search
USPC ........................................ 358/1.1–1.18, 402
See application file for complete search history.

(56) References Cited

U.S. PATENT DOCUMENTS

| 2006/0165421 | A1* | 7/2006 | Yamazaki | G03G 15/553 399/9 |
| 2016/0034228 | A1* | 2/2016 | Kaneko | G06K 15/005 358/1.13 |
| 2018/0121140 | A1* | 5/2018 | Yamagami | G06F 3/1208 |
| 2019/0303060 | A1* | 10/2019 | Ozeki | G03G 15/5012 |

FOREIGN PATENT DOCUMENTS

| JP | 2006-102990 A | 4/2006 |
| JP | 2007-028105 A | 2/2007 |

\* cited by examiner

*Primary Examiner* — Gabriel I Garcia
(74) *Attorney, Agent, or Firm* — ScienBiziP, P.C.

(57) ABSTRACT

The invention provides an image-forming apparatus that includes a printer that performs printing, and a controller that determines, on a basis of settings related to a print job, whether to execute the print job as a print job related to test printing or execute the print job as a normal print job, and causes the printer to perform printing, in which the settings related to the print job include a plurality of items, and one or more combinations of a setting of another item with respect to a setting of one item are set as recommended settings, and, when the print job includes a setting of the another item other than the recommended settings with respect to the setting of the one item, the controller determines that the print job is a print job related to test printing.

10 Claims, 12 Drawing Sheets

IMAGE-FORMING APPARATUS AND IMAGE-FORMING METHOD

BACKGROUND OF THE INVENTION

Field of the Invention

The invention relates to an image-forming apparatus and an image-forming method. More particularly, the invention relates to an image-forming apparatus and an image-forming method that determines whether to execute a print job as a print job related to test printing or execute the print job as a normal print job.

Description of the Background Art

A printing device that changes at least a paper feed tray from settings for production printing in order to perform test printing for a user who intends to perform test printing is known (see, for example, Japanese Unexamined Patent Application Publication No. 2006-102990).

Also, a print control device is known which, when test printing is set for a print job, sets, for the test printing, a second printing condition which differs from a first printing condition related to the print job. This print control device performs control to execute test printing based on the print job under the second printing condition, and execute the print job under first print condition (see, for example, Japanese Unexamined Patent Application Publication No. 2007-28105).

The technology related to both Japanese Unexamined Patent Application Publication No. 2006-102990 and Japanese Unexamined Patent Application Publication No. 2007-28105 is suitable for a user who intentionally performs test printing, but the user needs to perform various settings in order to perform test printing. Also, a user who does not intend to perform test printing or a user who does not know how to perform test printing may end up mistakenly performing production printing with print settings that are not optimal.

In view of the foregoing situation, the invention provides an image-forming apparatus and an image-forming method that enables test printing to be performed without complicated settings, and makes it possible to inhibit incorrect settings in normal printing that is not test printing (hereinafter, referred to as normal printing or production printing).

SUMMARY OF THE INVENTION

The invention provides an image-forming apparatus that includes a printer that performs printing, and a controller that determines, on a basis of settings related to a print job, whether to execute the print job as a print job related to test printing or execute the print job as a normal print job, and causes the printer to perform printing, in which the settings related to the print job include a plurality of items, and one or more combinations of a setting of another item with respect to a setting of one item are set as recommended settings, and, when the print job includes a setting of another item other than the recommended settings with respect to the setting of the one item, the controller determines that the print job is a print job related to test printing.

Also, the invention provides an image-forming method that includes receiving and storing, by a processor, one or more combinations of a setting of another item with respect to a setting of one item, from among settings of a plurality of items related to a print job, as recommended settings, receiving, by the processor, settings related to a print job, determining, by the processor, whether to execute the print job as a print job related to test printing or execute the print job as a normal print job on a basis of the received setting, and performing, by the processor, printing related to test printing or normal printing on the basis of the determination, in which, in the determining, the processor determines that the print job is a print job related to test printing when the print job includes a setting of another item other than the recommended settings with respect to the setting of the one item.

In the image-forming apparatus according to the invention, when a print job includes a setting of another item other than recommended settings with respect to a setting of one item, the controller determines the print job is a print job related to test printing, and test printing can be performed without complicated settings having to be made.

According to the invention, the optimum print settings are registered as recommended settings in advance, when printing on special paper, such as postcard printing, for example. If the user tries to perform printing with settings different from the registered recommended settings, the controller determines that the printing is test printing. Therefore, the user can easily execute test printing.

The image-forming method according to the invention also displays the same effects.

DESCRIPTION OF THE PREFERRED EMBODIMENTS

Hereinafter, the invention will be described in more detail with reference to the accompanying drawings. Note that the description below is only an example in all respects and should not be construed as limiting the invention.

Embodiment 1

Example Configuration of an Image-Forming Apparatus

Figure 1:
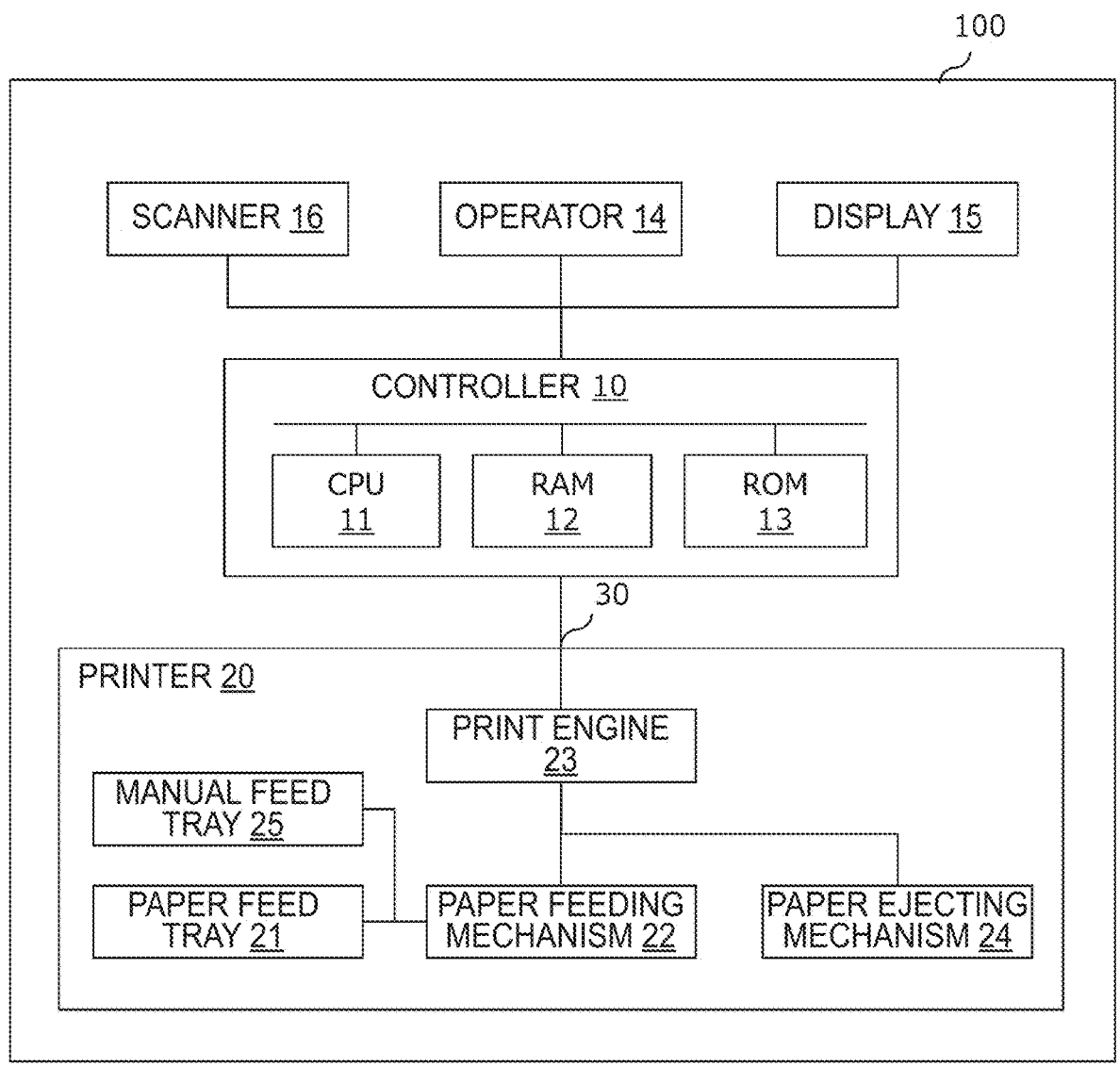
FIG. 1 is a block diagram illustrating a configuration of a digital multi-function device according to one embodiment.
Figure 2:
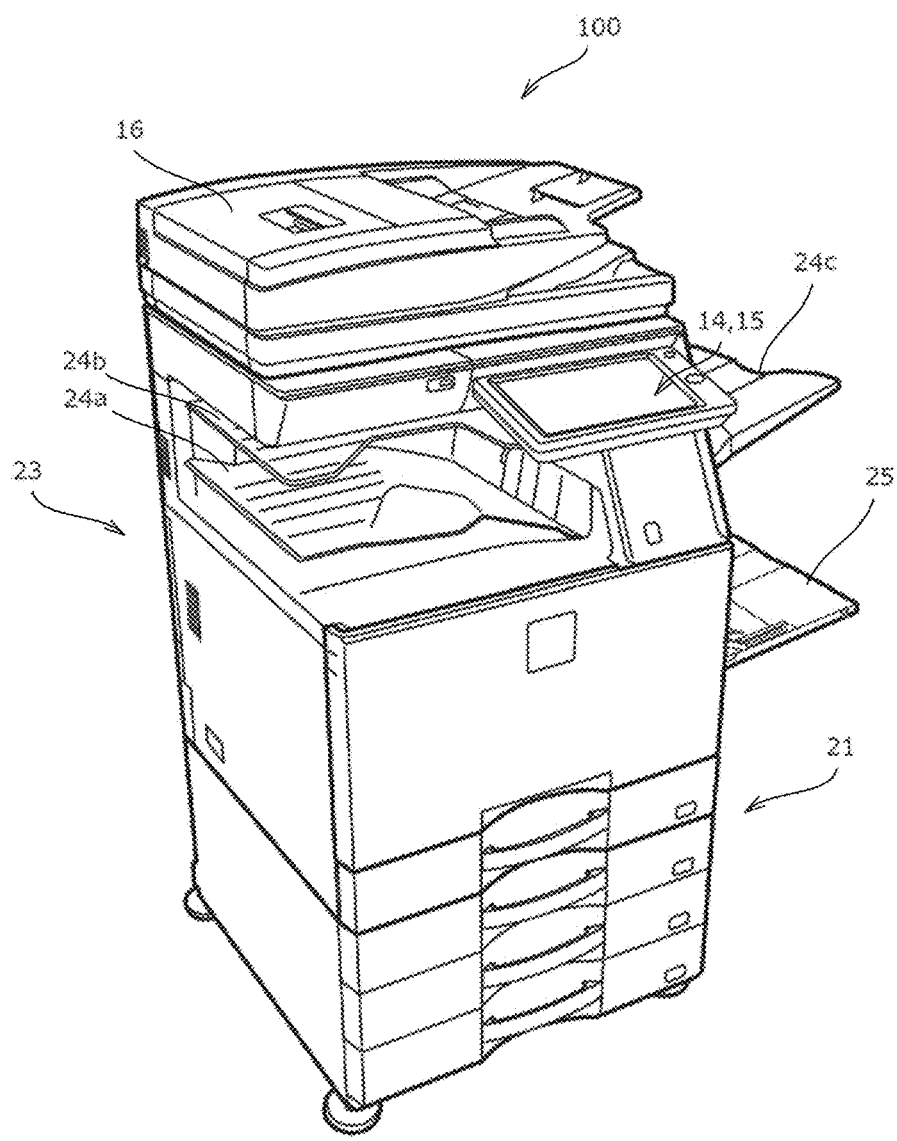
FIG. 2 is a perspective view of the exterior of the digital multi-function device illustrated in FIG. 1.
Figure 3:
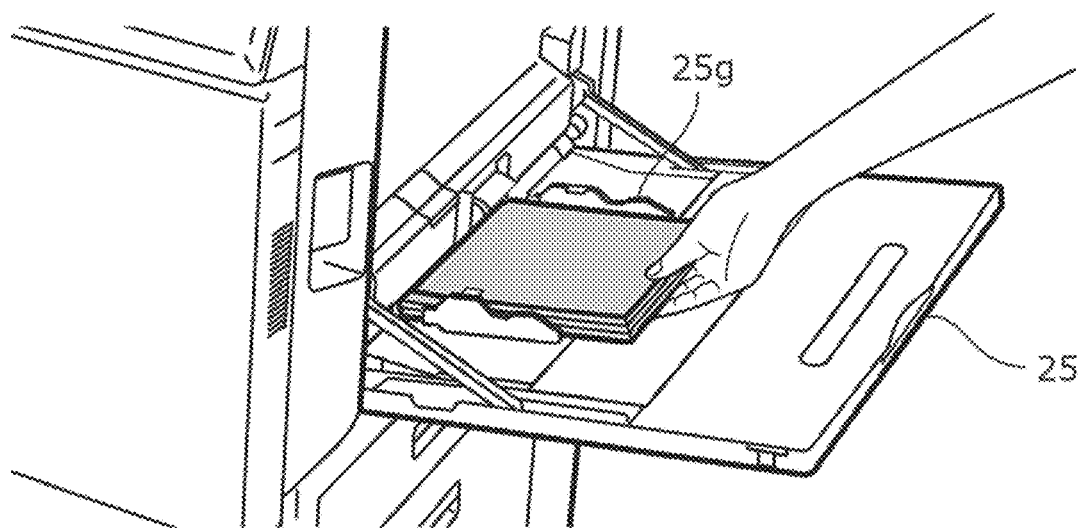
FIG. 3 is an explanatory view illustrating the way in which a user loads paper in a manual feed tray according to a recommended setting, in the embodiment.

First, the configuration of a digital multi-function device, which is one embodiment of the image-forming apparatus according to the invention, will be described. FIG. 1 is a block diagram illustrating the configuration of the digital multi-function device according to the embodiment. FIG. 2 is a perspective view of the exterior of the digital multi-function device illustrated in FIG. 1. FIG. 3 is an explanatory view illustrating the way in which a user loads paper into a manual feed tray 25 of the digital multi-function device in FIG. 1.

As illustrated in FIG. 1 and FIG. 2, the digital multi-function device 100 of this embodiment is provided with a controller 10 and a printer 20. Moreover, the digital multi-function device 100 is provided with an operator 14, a display 15, and a scanner 16.

The controller 10 and the printer 20 are connected by a bus 30 and can communicate with each other.

The controller 10 is provided with a Central Processing Unit (CPU) 11 that is a processor, and a Random Access Memory (RAM) 12 and a Read Only Memory (ROM) 13 that are memory. At least a portion of the ROM 13 may be rewritable non-volatile memory. The CPU 11 reads a control program stored in the ROM 13 and loads the control program into the RAM 12 as appropriate. Then, the CPU 11 executes processing in accordance with the control program loaded into the RAM 12. Control of the digital multi-function device 100 is realized according to this processing.

The CPU 11 causes a display related to a user interface to be displayed on the display 15, in accordance with the control program stored in the ROM 13. Then, the CPU 11 receives operational input performed with respect to the operator 14 by the user. The CPU 11 then performs hardware control on the digital multi-function device 100 to realize a function such as print processing, in accordance with the control program.

The controller 10 controls the digital multi-function device 100 in cooperation with hardware resources included in the digital multi-function device 100, by the CPU 11 executing the control program stored in the ROM 13.

The operator 14 includes a plurality of operation buttons that are provided on a case of the digital multi-function device 100 and are operated by the user, and a touch panel disposed on a display screen of the display 15 that will be described later. The controller 10 recognizes a signal indicating an input operation with respect to the operator 14.

The display 15 is formed by a liquid crystal display device, for example. The display 15 is able to display various information and images and the like, on the basis of input received by the operator 14 and the like, for example. The controller 10 generates and updates content to be displayed on the display 15. Accordingly, the display 15 displays various information and images.

FIG. 4 to FIG. 18 illustrate examples of operation screens displayed on the display 15 by the controller 10 in this embodiment.

Moreover, the scanner 16 that reads an image of an original document is connected to the controller 10. The scanner 16 executes, under the control of the controller 10, image reading processing of a copy, fax, and scanner job.

The printer 20 is provided with paper feed trays 21, the manual feed tray 25, a paper feeding mechanism 22, a print engine 23, and a paper ejecting mechanism 24. The paper ejecting mechanism 24 includes paper ejection trays 24a, 24b, and 24c.

The paper feed trays 21 include a plurality of trays that individually accommodate various sizes of paper.

The manual feed tray 25 is a tray capable of feeding various sizes and types of paper. The manual feed tray 25 is provided with a pair of manual feed guides 25g that can slide in the width direction perpendicular to the paper conveying direction, and a paper length sensor in the paper conveying direction, not illustrated in FIG. 3. The controller 10 receives a signal from the position of the manual feed guides 25g and the paper length sensor, and recognizes the conveying direction and the size in the width direction of a sheet placed in the manual feed tray 25.

Under the control of the controller 10, the paper feeding mechanism 22 feeds paper in a specified paper feed tray into the printing device and conveys the paper to the print engine 23.

Then, under the control of the controller 10, the print engine 23 prints specified image data onto the paper fed from one of the paper feed trays 21 or the manual feed tray 25.

The paper ejecting mechanism 24 ejects the paper printed by the print engine 23 to one of the ejection trays 24a, 24b, or 24c.

Note that in this embodiment, the print engine 23 is assumed to be an electrophotographic type of print engine, and a mechanism that realizes a process such as charging, exposure, development, and transfer is disposed around an electrophotographic photoreceptive drum. However, the configuration of the print engine 23 is not limited to this, and may be any type. For example, in the case of an inkjet type, the printer is provided with a carriage mechanism and a print head and the like, instead of an electrophotographic photoreceptive drum and the like.

Presetting Related to Test Printing

Next, processing related to test printing executed by the controller 10 will be described.

In this embodiment, it will be assumed that text or an address on a postcard will be copied using the manual feed tray 25. As the recommended setting, "Thick 1" is set in advance for a paper size of "Postcard" or "Return postcard".

Figure 18:
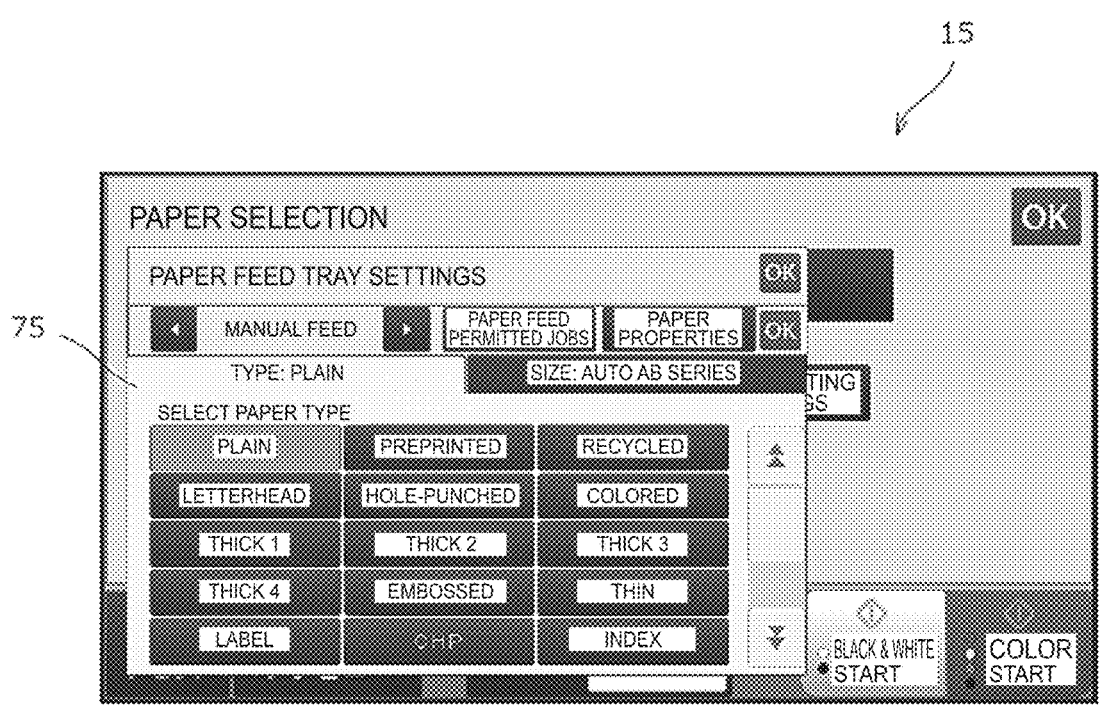
FIG. 18 is an explanatory view of a paper type setting screen displayed by the controller in response to touching a manual feed tray button in the paper selection screen in FIG. 17.

Note that in this embodiment, aside from "Thick 1", "Thick 2", "Thick 3", or "Thick 4" can be selected as the paper type corresponding to the paper thickness, as illustrated in FIG. 18. "Plain", "Thick 1", "Thick 2", "Thick 3", and "Thick 4" are classified and set according to the range of weight per unit area of the paper. Also, postcard paper of government postcards and the like shall belong to the category of "Thick 1".

That is, in this embodiment, with the digital multi-function device 100, optimum printing quality is obtained by printing a paper size of "Postcard" or "Return postcard" with a paper type of "Thick 1". When postcard paper is printed with a setting other than "Thick 1" (for example, with a paper type of "Plain"), the controller 10 regards this as test printing. Also, the user is notified that the paper type setting will change to "Thick 1", on the basis of a preset condition (for example, the number of copies to be printed).

The user can select, on the basis of this notification, whether to continue test printing or change to the recommended setting and perform normal printing.

In this way, it is possible to inhibit a situation from occurring in which a user who does not intend to explicitly perform test printing prints a postcard with unsuitable settings by mistake. Also, the hassle for a user who intends to perform test printing to change to the recommended settings after test printing in order to obtain suitable print quality can be simplified. Such hassle includes, for example, changing the setting of the paper type of the manual feed tray 25, or loading paper into a paper feed tray different from the manual feed tray 25 and the like.

In this embodiment, a case is assumed in which, as the settings related to a print job, a setting other than "Thick 1" is set for the paper type item when "Postcard" or "Return postcard" is set for the paper size item, and an instruction to execute a print job has been received. In this case, the controller 10 determines that this print job is a print job related to test printing.

As described above, the controller 10 determines that a combination in which a paper type other than "Thick 1" is set for a paper size setting of "Postcard" or "Return postcard" is not a recommended setting. Conversely, the controller 10 will not determine that a combination in which a paper size other than "Postcard" or "Return postcard" is set for a paper type setting of "Thick 1" is not a recommended setting. For example, the controller 10 will not determine that a combination in which a paper size of "A5", "A4", "A3", "B5", or "B4" is set for a paper type setting of "Thick 1" is not a recommended setting, but will instead determine that normal printing is to be performed.

Not limited to this, even if a combination in which another item setting with respect to one item setting is set as the recommended settings, the reverse combination, i.e., the one item setting with respect to the other item setting, is not limited to being set as the recommended settings.

In this embodiment, the recommended settings are determined in advance by a designer in accordance with the capabilities of each model of the image-forming apparatus, and are stored in the ROM 13 beforehand.

First, a setting that enables a determination related to test printing to be made will be described.

Figure 4:
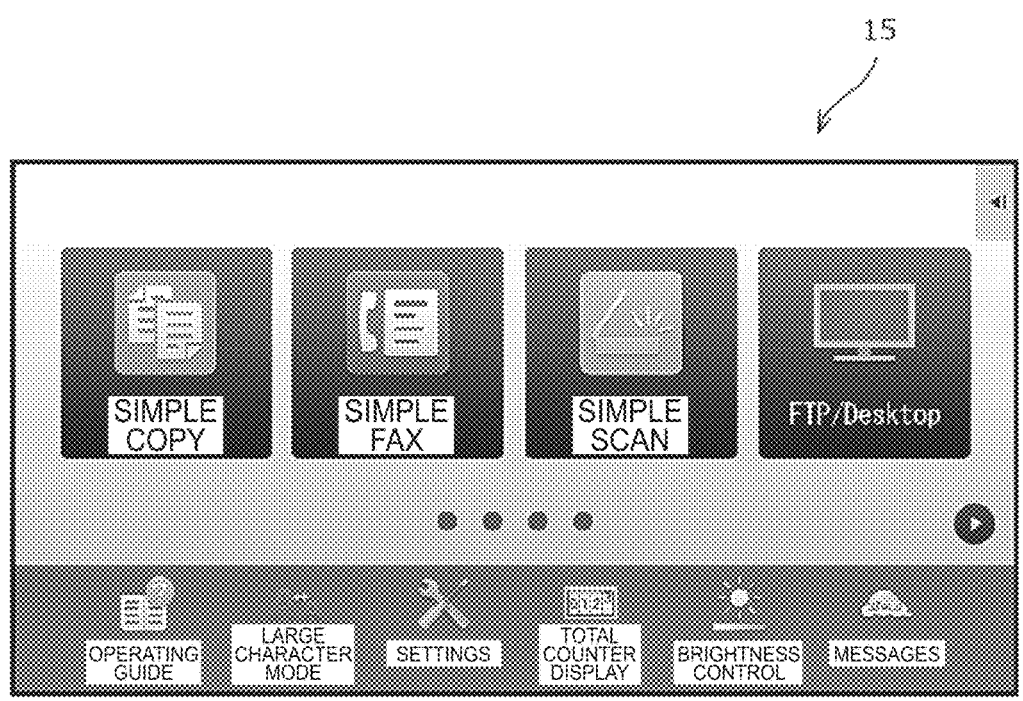
FIG. 4 is an explanatory view of an example of a screen (Home screen) displayed on a display of the digital multi-function device illustrated in FIG. 1 and FIG. 2.

FIG. 4 is an explanatory view of an example of a home screen caused to be displayed by the controller 10 on the display 15 of the digital multi-function device 100 illustrated in FIG. 1, and FIG. 2. The home screen is a basic operating screen displayed in a standby state after a power supply has been turned on, for example.

Four icons corresponding to individual jobs are arranged in the upper portion of the home screen. These four icons are "Simple copy", "Simple fax", "Simple scan", and "FTP/Desktop". An arrow button (page switching button) is arranged at the right end below the icons. When the user touches the page switching button, the controller 10 causes other icons to be displayed in place of the four icons illustrated in FIG. 4.

Six icons related to notifications and settings are arranged in the lower portion of the home screen. These six icons are "Operating guide", "Large character mode", "Settings", "Total counter display", "Brightness control", and "Messages".

Of these, when the "Settings" icon is touched, the controller 10 causes a list of setting items that can be operated by the user to be displayed, and receives the selection by the user (not illustrated in FIG. 4). "Test printing settings" is included in the setting items. When the user selects "Test printing settings", the controller 10 displays the setting screen illustrated in FIG. 5 on the display 15.

Figure 5:
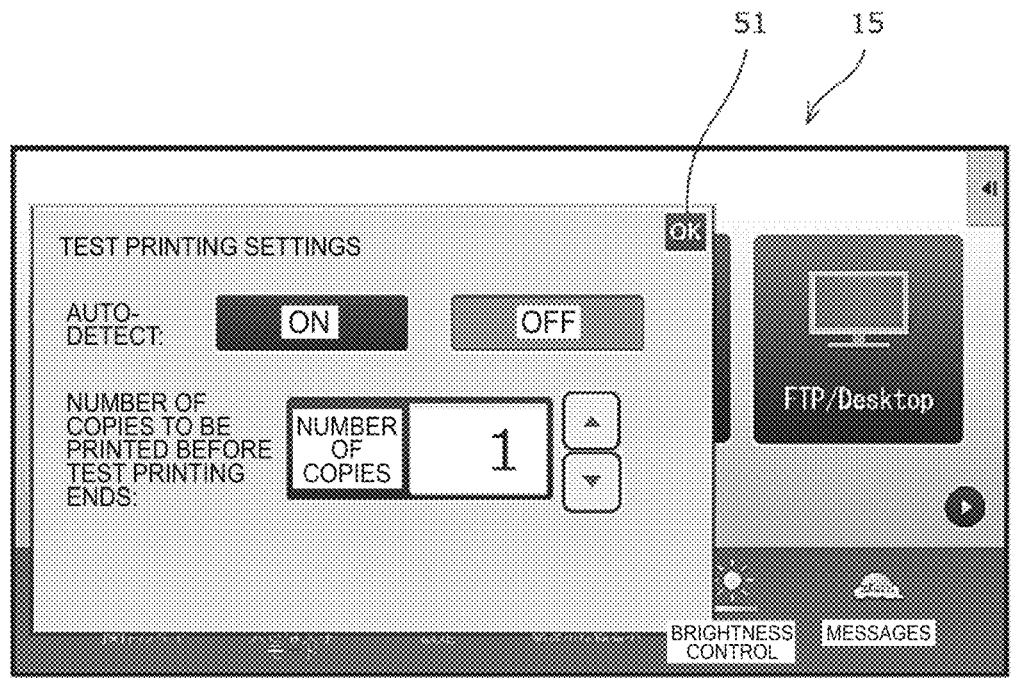
FIG. 5 is an explanatory view of a screen before settings have been made on a test print setting screen, in the embodiment.

As illustrated in FIG. 5, the "Test printing settings" screen includes a button for setting auto-detect on or off, and a button for setting the number of copies to be printed before test printing ends. Moreover, the "Test printing settings" screen also includes an "OK" button 51 in the upper right corner. The controller 10 receives an operation with respect to this "Test printing settings" screen and updates the display of the display 15 and the data related to the settings. In this embodiment, the data related to the settings is stored in the ROM 13 which is rewritable non-volatile memory. The default setting value is stored in advance in a non-rewritable region of the ROM 13, and this default setting value may be referred to before setting is performed by the user.

The "Test printing settings" screen illustrated in FIG. 5 is used to set, in advance, whether, when there is an instruction to execute a print job with settings that do not match the recommended settings, the controller 10 will perform processing that determines that the print job is to be performed in the test print mode. That is, the "Test printing settings" screen is used to perform a setting to enable or disable the determination.

Also, when operated in the test print mode, the "Test printing settings" screen is used to set, in advance, the number of copies to be printed until printing switches to normal printing after test printing.

Figure 6:
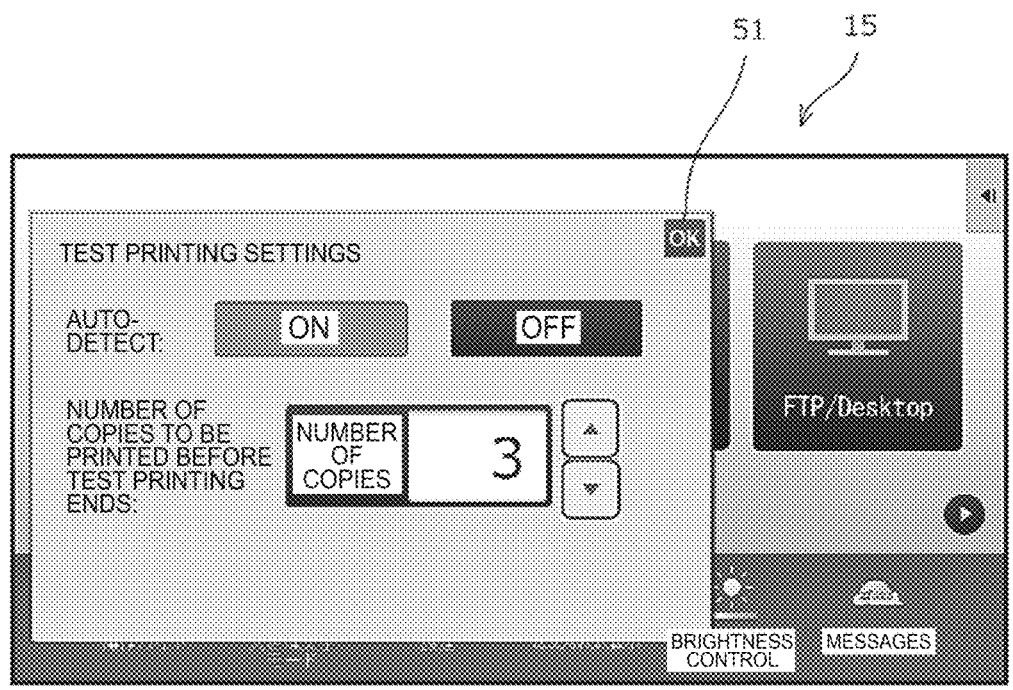
FIG. 6 is an explanatory view of a screen after settings have been made on the test print setting screen, in the embodiment.

As illustrated in FIG. 6, upon receiving an operation by the user, the controller 10 changes auto-detect to "on" and sets the number of pages to be printed before test printing ends to "3".

The controller 10 updates the data related to the settings set using the "Test printing settings" screen. The data related to the settings is stored in the ROM 13 which is rewritable non-volatile memory.

Figure 7:
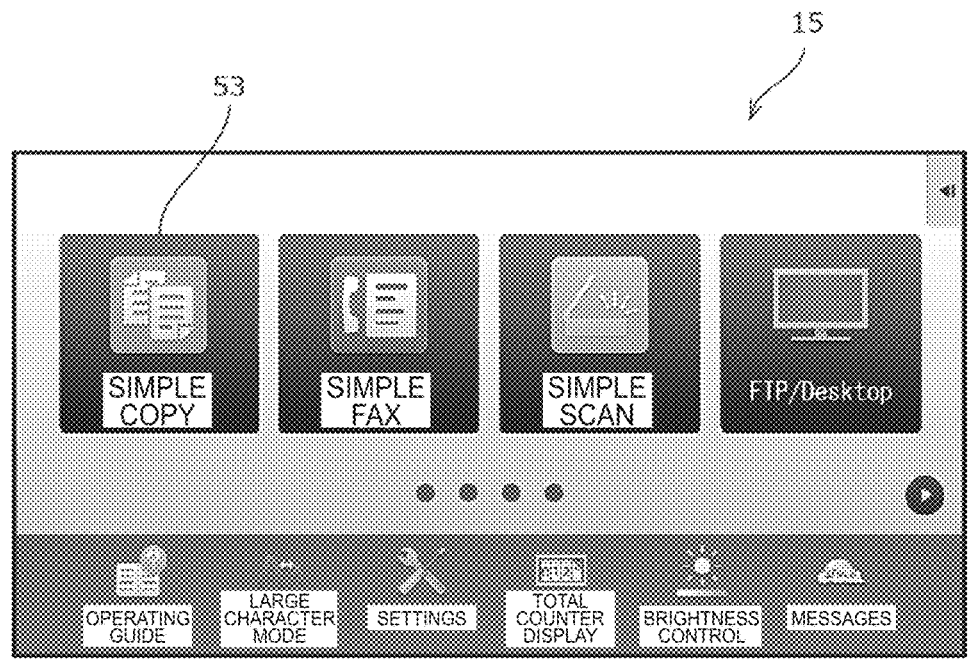
FIG. 7 is an explanatory view of the same home screen as that in FIG. 4, in the embodiment.

When the user touches the "OK" button 51, the controller 10 closes the "Test printing settings" screen, and displays the original home screen on the display 15 (refer to FIG. 7).

The foregoing is an example of processing in which the controller 10 receives a setting to enable determination related to test printing.

Test Printing Determination of Copier Job

Next, determination processing of test printing will be described using a copier job as an example. A copier job includes an image reading job that involves reading an image of an original document, and a print job that involves printing the read image of the original document.

Figure 8:
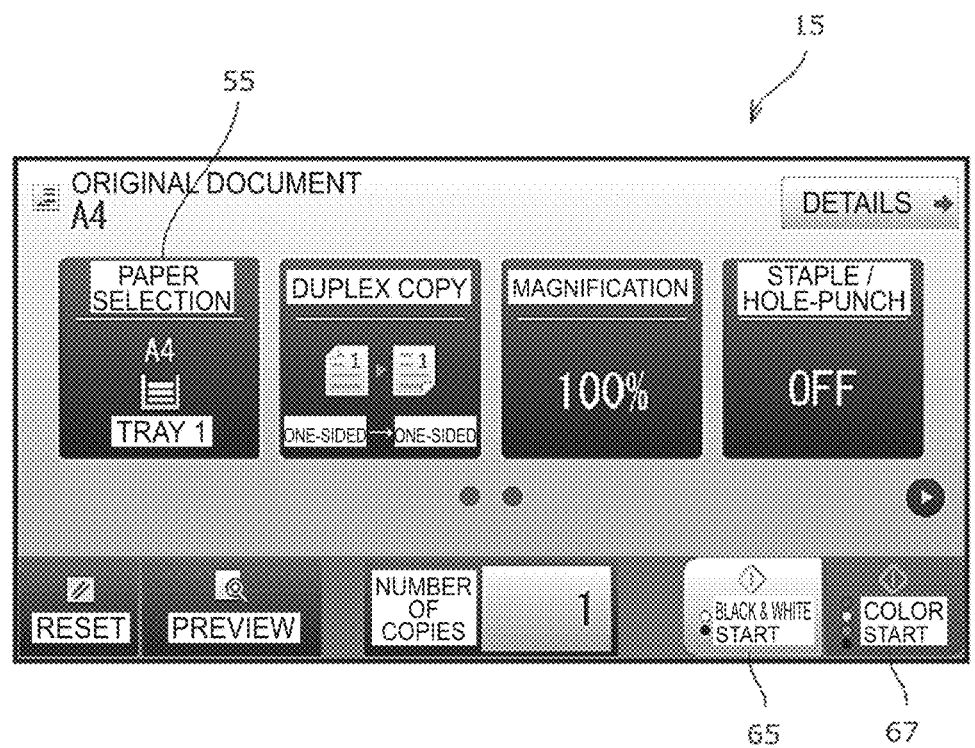
FIG. 8 is an explanatory view of a simple copy screen before the manual feed tray has been selected, in the embodiment.

When the user touches the "Simple copy" icon 53 on the home screen illustrated in FIG. 7, the controller 10 displays a simple copy operating screen on the display 15 (refer to FIG. 8).

As illustrated in FIG. 8, the simple copy operating screen displays the current settings for the basic setting items related to a copier job, and has icons and buttons for changing these settings. Icons related to "Paper selection," "Duplex copy", "magnification", and "Staple/hole-punch" are arranged in the upper portion of the simple copy operating screen. A page switching button is arranged below these icons.

A "Reset" button used to return to the standard settings and a "Preview" button for previewing the original document are arranged in positions toward the left on the lower portion of the simple copy operating screen. Also, an icon for setting the number of sets of copies is arranged in the center of the lower portion of the simple copy operating screen. Further, a "Black & white start" button 65 and a "Color start" button 67 that receive an instruction to start each black and white copy or color copy copier job are provided at positions toward the right of the lower portion of the simple copy operating screen.

When the "Paper selection" icon 55 is touched, the controller 10 causes a paper selection screen to be displayed on the display 15, instead of the simply copy screen. Note that the display at the lower portion of the paper selection screen is the same as that of the simple copy screen.

Figure 9:
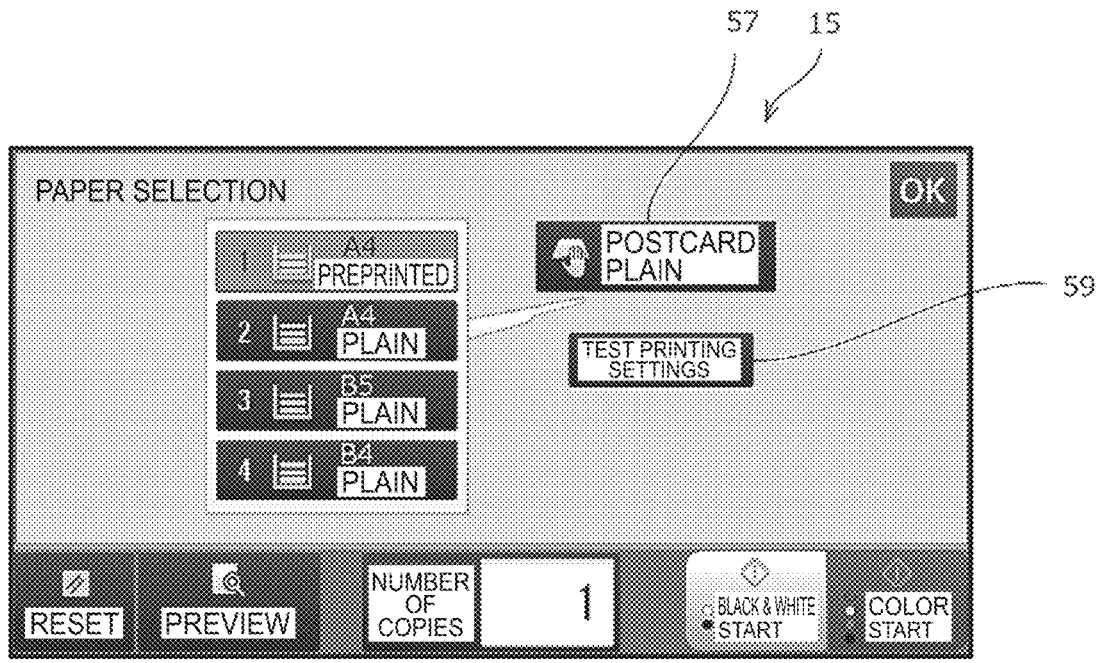
FIG. 9 is an explanatory view of a paper selection screen, in the embodiment.

As illustrated in FIG. 9, buttons corresponding to the four paper feed trays 21 are arranged on the paper selection screen. The controller 10 displays the remaining amount of paper stored in each tray, the paper size, and the paper type on corresponding buttons.

FIG. 9 illustrates a state in which the uppermost tray, "Tray 1", is selected when paper selection is selected. This is consistent with the display of the paper selection icon in FIG. 8.

A button corresponding to the manual feed tray 25 (hereinafter, referred to as the manual feed tray button) is further arranged on the paper selection screen. The controller 10 causes the paper size and paper type of paper loaded in the manual feed tray 25 to be displayed on the manual feed tray button 57. In the example in FIG. 9, the paper size is set to "Postcard", and the paper type is set to "Plain".

A test printing settings button 59 is arranged below the manual feed tray button 57. When the test printing settings button 59 is touched, the controller 10 causes a test printing settings screen similar to the test printing settings screen illustrated in FIG. 5 to be displayed on the display 15.

When the manual feed tray button 57 is touched by the user, the controller 10 changes the selection such that paper will be fed from the manual feed tray 25 instead of "Tray 1" that was previously selected.

After the selection has been changed to the manual feed tray 25, the controller 10 checks whether a combination that does not match the recommended settings is included for the newly selected manual feed tray 25. In this case, the paper type is not "Thick 1" for the paper size of "Postcard", so the controller 10 determines that the setting is not the recommended setting.

Figure 10:
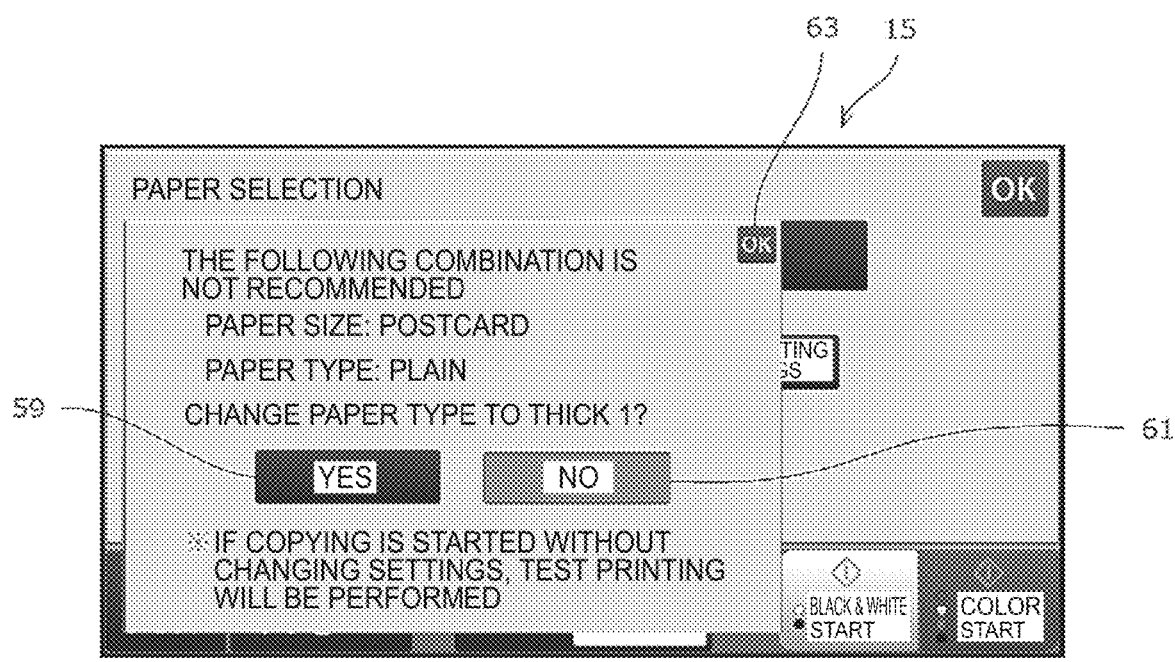
FIG. 10 is an explanatory view of an example of a notification given by a controller when it is determined that test printing is to be performed, in the embodiment.

On the basis of this determination, the controller 10 displays a notification indicating that the setting of a paper type of "Plain" for the paper size of "Postcard" is a combination that is not the recommended setting, as illustrated in FIG. 10. With this, the controller 10 also displays a button for changing to the paper type of "Thick 1" which is the recommended setting. If the "YES" button 59 is touched, the controller 10 will close the notification screen and return to the simple copy operating screen (refer to FIG. 11). At the same time, the controller 10 will change the paper type setting from the current "Plain" to "Thick 1".

The notification further will notify the user that test printing will be performed if a copier job is started without changing the settings. If a "No" button 61 that is displayed together with the "YES" button 59 described above is touched, the controller 10 will close the notification screen and return to the simple copy operating screen (refer to FIG. 11). In this case, the paper type remains "Plain".

Figure 11:
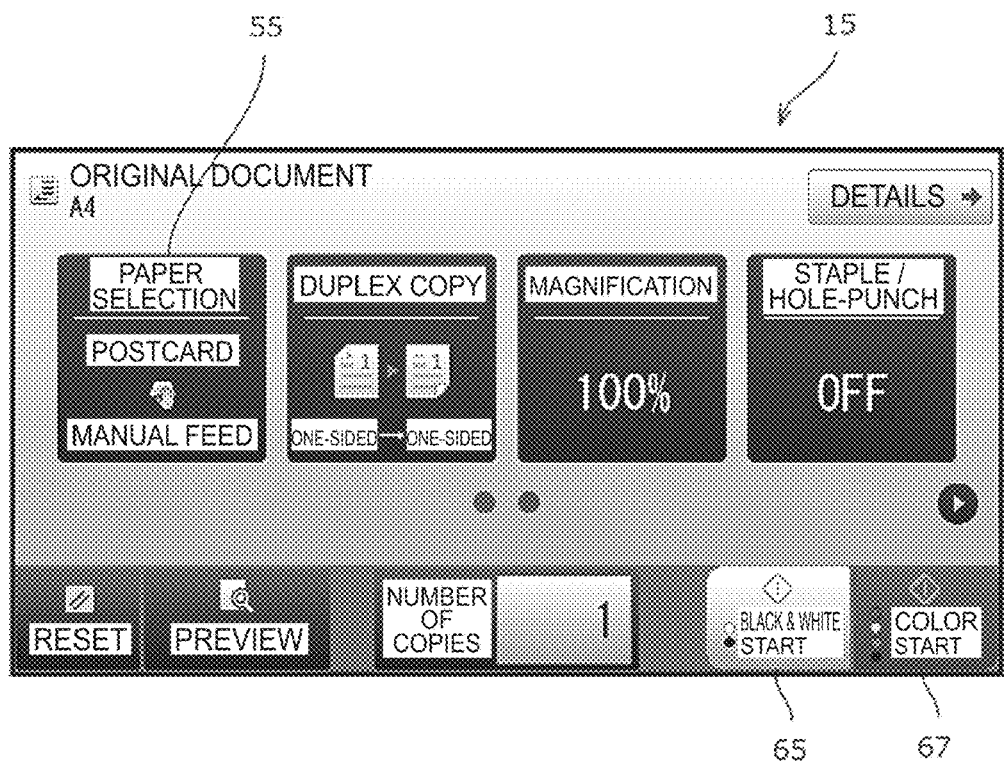
FIG. 11 is an explanatory view of a screen after simple copy has been selected after the manual feed tray has been selected, in the embodiment.

Also, if the "OK" button 63 in the upper right corner of the paper selection screen is touched, the controller 10 will return the display to the simple copy operating screen illustrated in FIG. 11. The paper type remains "Plain". Note that the selected manual feed tray is displayed in the "Paper selection" icon 55.

If the "Black & white start" button 65 or the "Color start" button 67 is touched on the operating screen in FIG. 11, the controller 10 executes a copier job as test printing.

Figure 12:
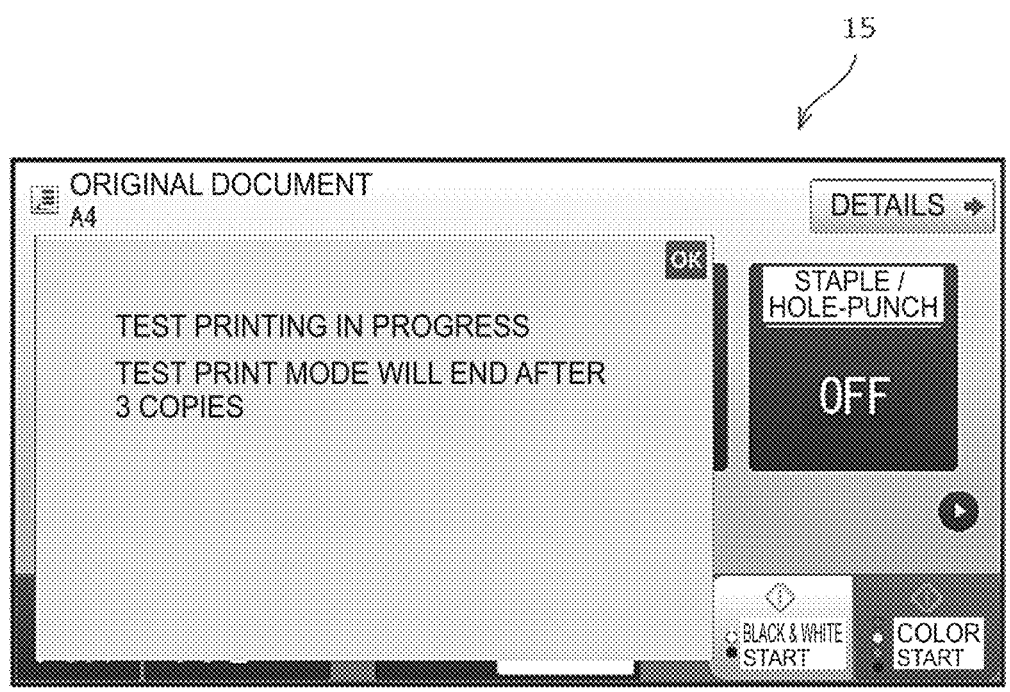
FIG. 12 is an explanatory view of an example of a notification given by the controller during test printing, in the embodiment.

While executing a copier job as test printing, the controller 10 displays an indication that the mode is the test print mode, as illustrated in FIG. 12, on the display 15. Note that "after 3 copies" in the message "test print mode will end after 3 copies" in the notification in FIG. 12 is based on the setting of the number of copies to be printed before test printing ends set in FIG. 6. The controller 10 updates the number of copies in the message as the number of copies in the test print mode increases.

When the remaining number of copies to be printed in the test print mode reaches zero, the controller 10 causes printing to be stopped. Alternatively, the controller 10 causes printing to be stopped when a copier job relating to test printing ends.

Figure 13:
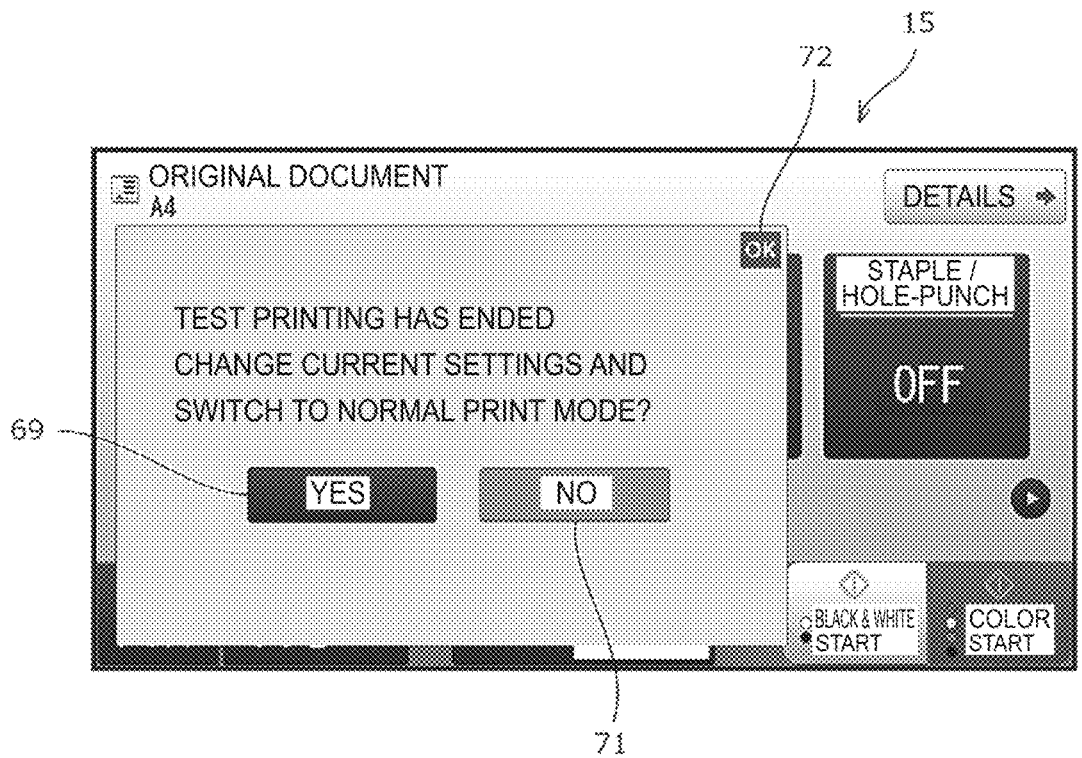
FIG. 13 is an explanatory view of an example of a notification given by the controller after test printing, in the embodiment.

Also, notification indicating that test printing has ended is displayed on the display 15, as illustrated in FIG. 13. With this notification, the controller 10 also displays a button for changing from the current setting related to test printing to a paper type of "Thick 1" which is the recommended setting, and switching to the normal print mode. If the "YES" button 69 is touched, the controller 10 will close the notification screen and return to the simple copy operating screen (refer to FIG. 16). At the same time, the controller 10 will change the paper type setting from the current "Plain" to "Thick 1".

If a "NO" button 71 that is displayed together with the "YES" button 69 described above is touched, the controller 10 will keep the paper type setting as "Plain" and display on the display 15 a setting screen (refer to FIG. 14) for setting the number of pages to be printed in the test print mode until the notification illustrated in FIG. 13 is displayed again.

Figure 14:
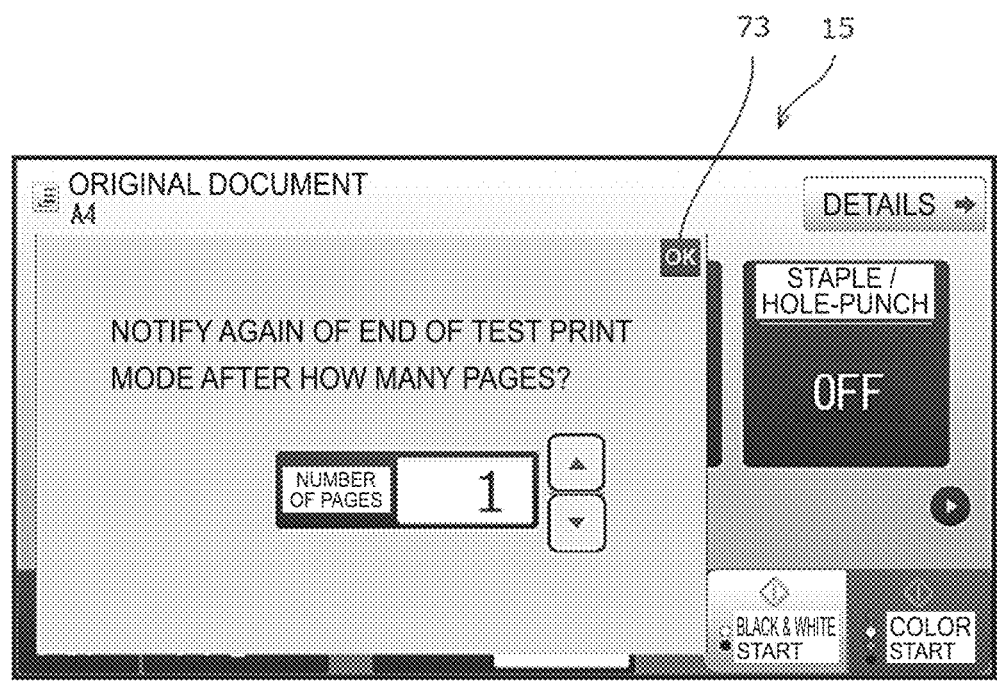
FIG. 14 is an explanatory view of an example of a screen displayed by the controller in response to selecting "NO" in the notification illustrated in FIG. 13, in the embodiment.
Figure 16:
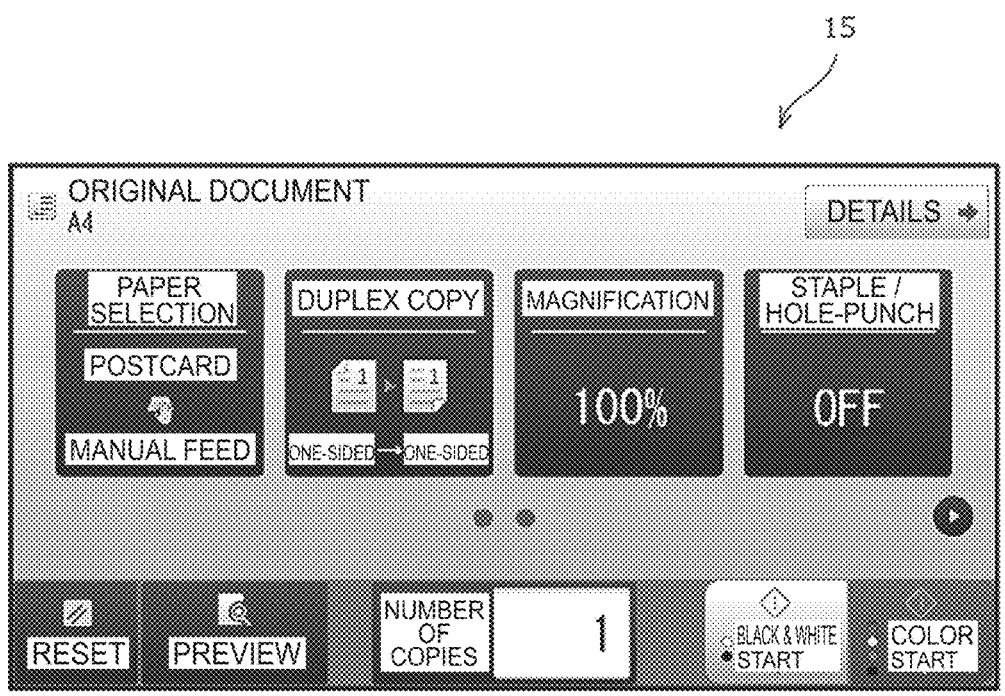
FIG. 16 is an explanatory view (similar to FIG. 11) of the simple copy screen displayed after "OK" has been pressed in the screen illustrated in FIG. 14, in the embodiment.

When a setting related to re-notification is received and the "OK" button 73 is touched on the settings screen illustrated in FIG. 14, the controller 10 closes the settings screen and returns the display to the simple copy operating screen (refer to FIG. 16). Then, the start of a new copier job or a change in the settings is received.

Figure 15:
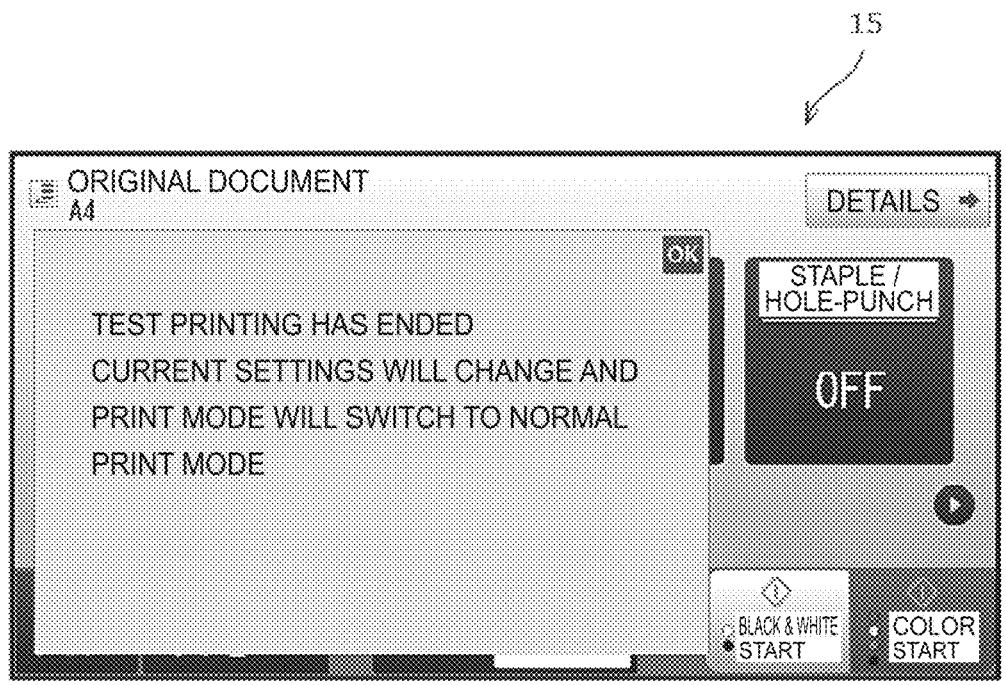
FIG. 15 is an explanatory view of a different mode of the notification illustrated in FIG. 13, in the embodiment.

As a different mode of the notification in FIG. 13, when the remaining number of pages to be printed in the test print mode reaches zero, the controller 10 may cause the printing to stop, and display, on the display 15, a notification indicating that the settings will change to the recommended settings and printing will switch to normal printing because test printing has stopped, as illustrated in FIG. 15. According to this mode, there is no option to continue test printing.

Also, it is described that when the "YES" button 59 or 69 is touched on the notification screen illustrated in FIG. 10 or FIG. 13, the controller 10 will change the paper type setting from the current "Plain" to "Thick 1" according to the recommended setting. Aside from this, when the "OK" button 63 or 72 in the screen illustrated in FIG. 10 or FIG. 13 is touched, the controller 10 will return the display to the simple copy operating screen illustrated in FIG. 11 or FIG. 16. When "Paper selection" on this screen is touched, the controller 10 causes the paper selection screen to be displayed on the display 15 (refer to FIG. 17). Then, the setting of the manual feed paper type is received on the paper selection screen.

Figure 17:
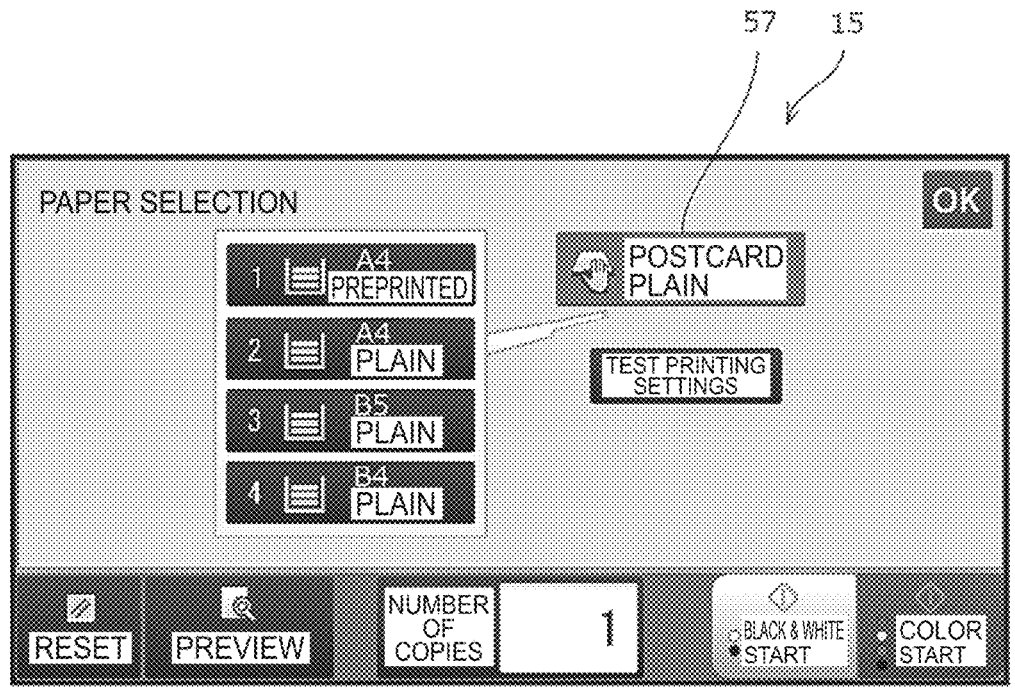
FIG. 17 is an explanatory view of a paper selection screen displayed by the controller in response to touching "Paper selection" in the simple copy screen in FIG. 16.

More specifically, when the manual feed tray button 57 on the screen in FIG. 17 is touched, the controller 10 displays the manual feed tray settings screen 75 illustrated in FIG. 18 on the display 15.

As illustrated in FIG. 18, buttons for selecting the paper type for the manual feed tray 25 are arranged on the manual feed tray settings screen 75. Of these buttons, when "Thick 1" is touched, the controller 10 changes the paper type for the manual feed tray 25 from "Plain" to "Thick 1". Also, it is determined that the paper type of "Thick 1" that matches the recommended setting for the paper size of "Postcard" is set.

Note that in FIG. 18, not only a "Type" tab for setting the paper type, but also a "Size" tab for setting the paper size is provided. When the "Size" tab is touched, the controller 10 displays a screen for setting the paper size for the manual feed tray 25.

The paper size setting screen is used for switching paper size detection of AB series and inch series paper sizes, or to manually set a paper size that cannot be accurately determined by the resolution of the paper length sensor and the manual feed guides 25g.

Flowcharts

The sequence of processing related to the test printing executed by the controller 10 will be described with reference to the flowcharts.

Figure 19:
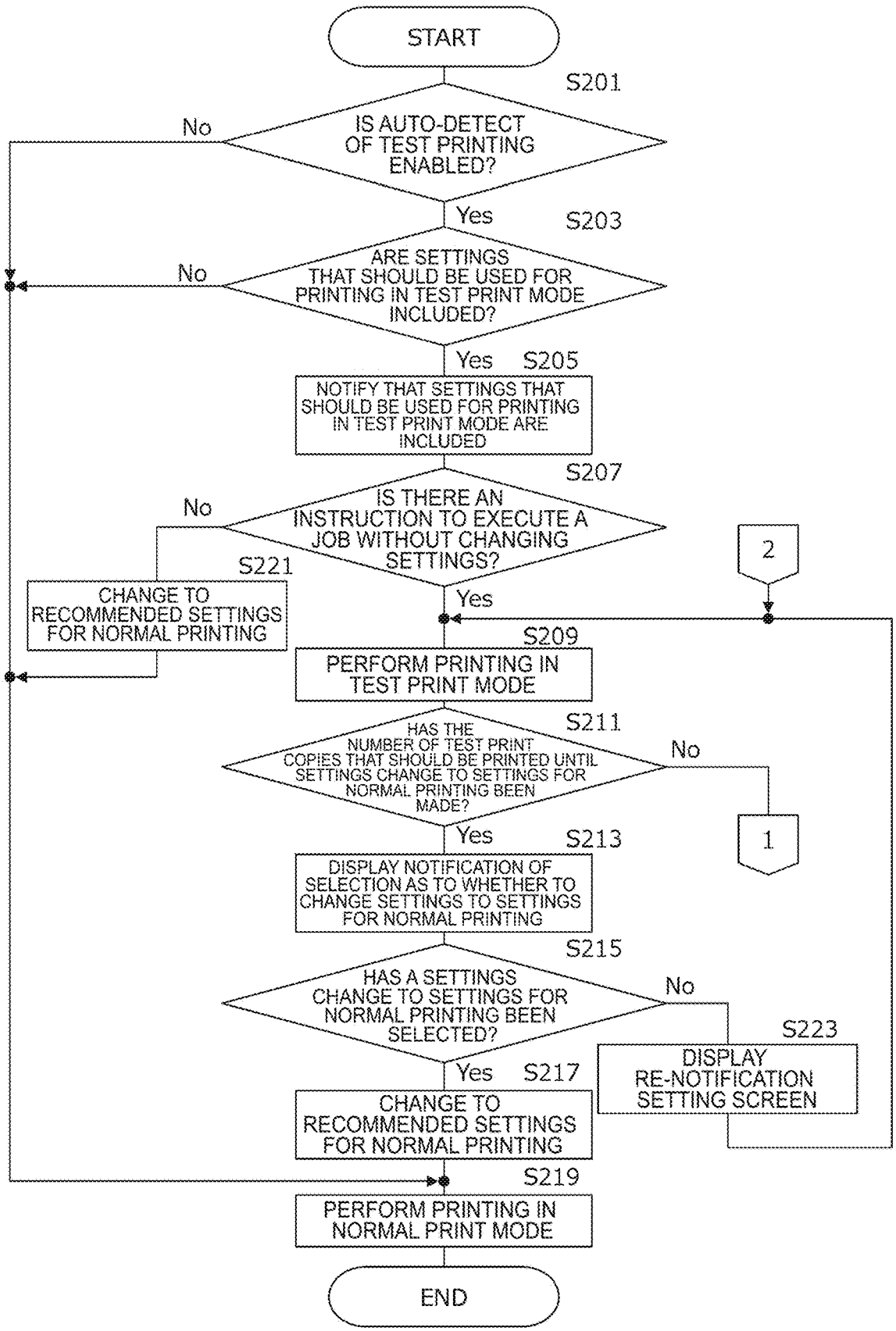
FIG. 19 is a first flowchart illustrating the flow of processing related to test printing executed by the controller, in the embodiment.
Figure 20:
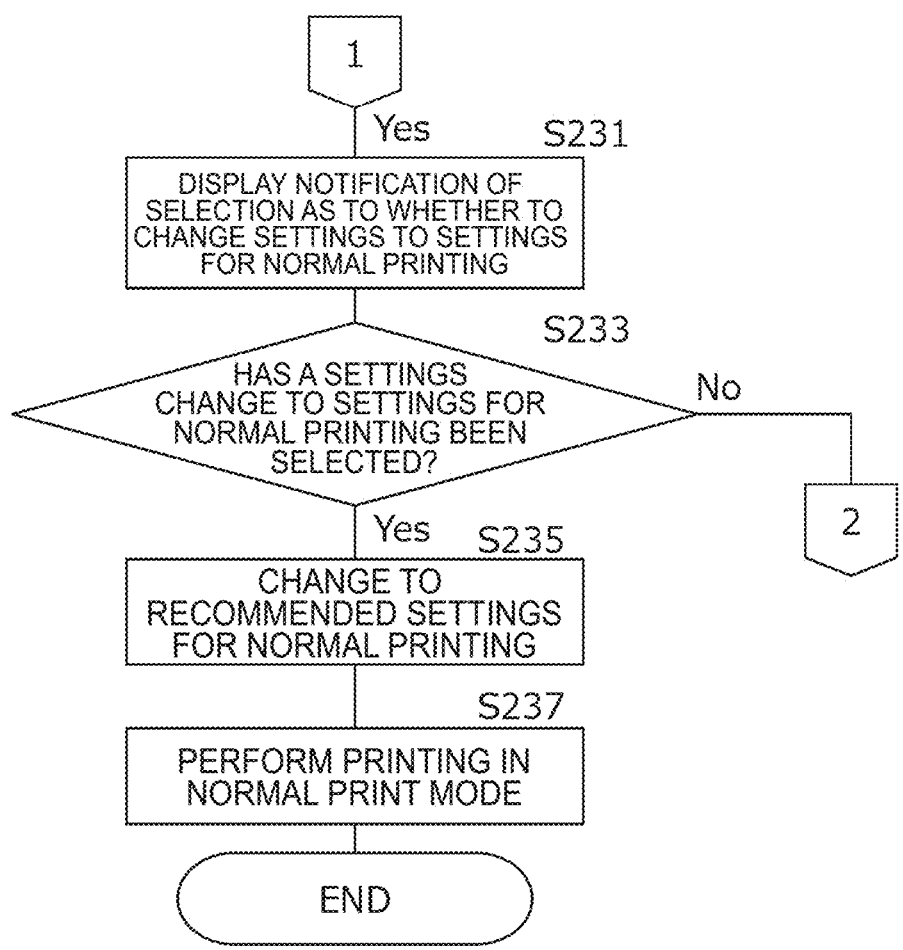
FIG. 20 is a second flowchart illustrating the flow of processing related to test printing executed by the controller, in the embodiment.

FIG. 19 and FIG. 20 are flowcharts illustrating the sequence of processing executed by the controller 10 in this embodiment. The controller 10 executes, by multitasking, the processing illustrated in FIG. 19 and FIG. 20 in parallel with other tasks, in a standby state for receiving settings related to a job.

As illustrated in FIG. 19, in the standby state, the controller 10 confirms data related to the test printing settings illustrated in FIG. 5 and FIG. 6, prior to receiving the settings related to a job (step S201). In this embodiment, the data related to the settings is stored in the ROM 13.

When the setting related to auto-detection of the test print mode is disabled (off) (No at step S201), the controller 10 will not determine whether test printing should be performed. When an instruction to execute a copier job is received, normal printing is executed always with the received settings (step S219).

However, when the setting related to auto-detection of the test print mode is enabled (on) (Yes at step S201), the controller 10 will determine whether the received settings related to a job include a combination of settings that do not match the recommended settings. That is, the controller 10 will determine whether the received settings related to a job include settings that should be used for printing in the test print mode (step S203).

If the received settings related the job do not include a combination of settings that do not match the recommended settings (No at step S203), the controller 10 executes normal printing always with the received settings, when an instruction to execute a copier job is received. (step S219).

However, if the received settings for the job includes at least one combination of settings that do not match the recommended settings (Yes at step S203), the controller 10 determines that printing should be performed in the test print mode. Then, the controller 10 notifies the user that the settings include a combination of settings that do not match the recommended settings (step S205). Together with this, the user is prompted to select whether to change the current settings to the recommended settings (refer to FIG. 10). It is preferable that the user be notified of the details of the combination of settings that do not match the recommended settings, together with the details of the corresponding recommended settings, as illustrated in FIG. 10.

If, in response to this notification, the user chooses to change to the recommended settings (No at step S207), the controller 10 executes the change to the recommended settings (step S221). Then when an instruction to execute a copier job is received, the controller 10 executes normal printing with the received settings (step S219).

If, at step S207, there is an instruction to execute the job without changing the settings (Yes at step S207), the controller 10 executes the copier job in the test print mode (step S209). The notification illustrated in FIG. 12 is given during test printing. Then, each time execution of test printing ends, the controller 10 determines whether test printing has been executed for the number of copies according to the test printing settings illustrated in FIG. 6 (step S211).

Until the number of test print copies made reaches this number (No at step S211), the controller 10 may display, on the display 15, a notification (refer to FIG. 13) of selection as to whether to change the settings to settings for normal printing when the test printing ends (step S231 in FIG. 20).

If a change in the settings to settings for normal printing has been selected on this notification screen (Yes at step S233), the controller 10 changes the combination of settings that do not match the recommended settings to settings that do match the recommended settings (step S235). Then, when an instruction to execute a copier job is received, the controller 10 executes normal printing with the received settings (step S237).

However, if a change in the settings to settings for normal printing has not been selected in the notification screen displayed in step S231 (No at step S233), the routine returns to step S209 in FIG. 19, and printing is executed in the test print mode when an instruction to execute a copier job is received.

If, in the determination in step S211, the number of copies in test printing has reached a predetermined number of copies (Yes at step S211 in FIG. 19), the controller 10 displays, on the display 15, notification (refer to FIG. 13) of the selection as to whether to change the settings to settings for normal printing (step S213 in FIG. 20).

If a selection to change the settings to settings for normal printing has been made on the notification screen illustrated in FIG. 13 (Yes at step S215), the controller 10 changes the combination of settings that do not match the recommended settings to settings that do match recommended settings (step S217). Then, when an instruction to execute a copier job is received, the controller 10 executes normal printing with the received settings (step S219).

If a change of the settings to settings for normal printing has not been selected in the notification displayed in step S213 (No at step S215), the controller 10 displays the setting screen for re-notification (refer to FIG. 14) on the display 15 (step S223), and receives a setting related to re-notification. When the "OK" button 73 on the re-notification settings screen is touched, the controller 10 advances the processing to step S209 described above. Then, when an instruction to execute a copier job is received, the controller 10 executes printing in the test print mode.

Heretofore is described the sequence of processing related to test printing.

Embodiment 2

In embodiment 1, an example is described in which the paper type of "Thick 1" is set as the recommended setting for the paper size of "Postcard" or "Return postcard".

As a different mode, the paper type of "Photo paper" may be set as the recommended setting for the paper size of "L" or "2L". In particular, this setting combination is often used when the print engine 23 is an inkjet model.

According to this mode, when a paper type other than "Photo paper" is set for the paper size of "L" or "2L" and an instruction to execute a print job is received, the controller 10 determines printing to be test printing.

Embodiment 3

As a different mode from embodiments 1 to 3, a combination in which "600 dpi" or "1200 dpi", for example, may be set as the recommended setting for the resolution of an item related to image quality, for a paper size of "Business card". That is, a setting lower than a predetermined resolution is excluded from the recommended setting for "Business card". The recommended setting related to the resolution is determined taking into account the fact that the size of characters used with business cards is smaller than the character size for normal documents.

Moreover, a paper type of "Thick 1" or "Thick 2" may be set as the recommended setting for the paper size of "Business card".

According to this mode, when a resolution of "400 dpi" or "300 dpi", for example, is set for the paper size of "Business card" and an instruction to execute a print job is received, the controller 10 determines printing to be test printing.

Moreover, when a paper type other than "Thick 1" or "Thick 2" is set for the paper size of "Business card" and an instruction to execute a print job is received, the controller 10 determines printing to be test printing.

Embodiment 4

Embodiments 1 to 3 have been described using a copier job as an example, but they can also be applied to another print job. For example, Embodiments 1 to 3 can also be applied to a printer job.

With a printer job, the operation and settings related to the screens in FIG. 4 to FIG. 18 may be performed on an information processing device connected to the digital multi-function device 100 via an interface circuit or a network not illustrated in FIG. 1 or FIG. 2. That is, in embodiments 1 to 3, an operation related to settings is received using the display 15 and the operator 14. In addition, or alternatively, similar settings may be performed by a printer driver operating in the information processing device. In this case, the design of the screens and the sequence of operations to reach the settings screens may differ from those illustrated in FIG. 4 to FIG. 18.

As described above, (i) an image-forming apparatus according to the invention includes a printer that performs printing, and a controller that determines, on a basis of settings related to a print job, whether to execute the print job as a print job related to test printing or execute the print job as a normal print job, and causes the printer to perform printing, and the settings related to the print job include a plurality of items, and one or more combinations of a setting of another item with respect to a setting of one item are set as recommended settings, and, when the print job includes a setting of another item other than the recommended settings with respect to the setting of the one item, the controller determines that the print job is a print job related to test printing.

In this invention, the printer prints an image of an original document or received data on paper. Specific modes of this include, for example, printers of an electrophotographic type, inkjet type, or other type of printer or digital multi-function device, such as mechanisms and circuits related to printing, and sensors and actuators and the like used to control them.

Also, the job is a series of processing executed in response to a single instruction (execution request) received from a user or an external device, and is processing related to image formation. Specific modes of this include, for example, a copier job, a printer job, a scanner job, a fax transmission job, and a fax reception job and the like. Here, for example, a copier job includes an image reading job that involves reading an image of an original document, and a print job that involves printing the read image of the original document. Also, a printer job includes a loading job that involves loading print data received from an external device or the like that is communicatively connected, and a print job that involves printing the loaded print data. That is, the print job according to the invention is not limited to a copier job, but relates to print processing related to a printer job or other job.

Furthermore, in this specification, test printing is used in contrast to normal printing (production printing), and refers to printing in order to check the finish of normal printing. Test printing is often performed for the purpose of verification prior to normal printing. For example, test printing refers to printing performed on inexpensive alternative paper to check the print finish at a stage before normal printing is performed on paper that is more expensive than ordinary printing paper, such as postcards and photo paper.

In this specification, the term "paper" refers to a sheet widely used as a printing medium, and the material is not limited to paper. For example, a transparent sheet made of resin for Overhead Projector (OHP) is also included as paper.

Also, the settings for a print job specify the conditions related to printing when executing a job related to printing. Specific modes of this include, for example, settings related to various items such as paper size, paper type, the condition of whether printing is to be one-sided printing or double-sided printing, printing magnification, number of sets, finishing processing (stapling, hole-punching, etc.), and the condition of whether printing is to be color printing or monochrome printing, and the like.

Furthermore, the recommended settings are settings in which a setting for another item is set with respect to one item, from among setting items related to a print job. The recommended settings according to the invention include, but are not limited to, settings related to printing on special paper. As a specific mode, for example, assuming printing is to be performed on a postcard, a recommended setting combines a paper type of thick with a paper size of postcard or return postcard. Also, assuming printing is to be performed on photo paper, the recommended setting combines a paper type of photo paper with a paper size that is photo size (L or 2L). Note that the paper type selection available (or not available) for the aforementioned postcard and photo printing depends on the capabilities of the image-forming apparatus. The recommended settings for each model of image-forming apparatus is determined in advance by the designer in accordance with the capabilities of each model. The recommended settings are stored in advance in ROM, for example.

The controller is configured around a CPU, and includes ROM, RAM, and an input/output interface circuit and the like, and is such that hardware resources and software resources are organically combined, and the functions thereof are realized, by the CPU executing a control program stored in the ROM in advance.

Furthermore, preferred aspects of the invention will be further described.

(ii) The image-forming apparatus may also include a notifier that notifies a user, and when it is determined that the print job is a print job related to test printing, the controller may notify, using the notifier, the user that the print job will be executed as a print job related to test printing.

Accordingly, the user can recognize that the settings related to the print job include a combination other than recommended settings, and printing will consequently be executed as test printing.

According to this aspect, notification is given when the user inadvertently tries to perform production printing with settings other than the recommended settings, so incorrect printing due to unintended settings can be inhibited.

(iii) The image-forming apparatus may also include an operator that receives an operation by the user relating to the print job, and, when it is determined that the print job is a print job related to test printing, the controller may notify the user using the notifier as to whether to change the settings related to the print job to the recommended settings, receive an operation to change the print job to the recommended settings via the operator, and change the settings related to the print job to the recommended settings when the operation is received.

Accordingly, notification is given when the settings related to a print job include in a combination other than the recommended settings, and upon receiving such notification, the user can change the settings related to the print job to the recommended settings, so the settings can be changed to the recommended settings without a complicated operation.

(iv) When it is determined that the print job is a print job related to test printing, the controller may receive a setting of the number of copies related to the test printing, and cause the notifier to notify the user of the remaining number of copies during the test printing.

Accordingly, upon receiving the notification, the user can recognize that the current printing is test printing, and the how many more copies will be printed before test printing ends.

(v) After the print job related to test printing ends, the controller may notify the user, using the notifier, as to whether to change the settings related to the print job to the recommended settings, and receive an operation to change the print job to the recommended settings via the operator.

Accordingly, when the test printing ends, the user can change the settings related to the print job to the recommended settings without having to perform a complicated operation.

(vi) The items may include at least one of a size, type, and print quality of printing paper.

Accordingly, after performing test printing related to at least one of the size, type, and print quality of the printing paper, production printing can be easily executed with a combination of suitable settings.

(vii) The recommended settings may include at least a combination in which the printing paper type item is set to "thick" when the printing paper size item is set to "postcard", and the controller may determine that a print job that includes a setting in which the type item is set to something other than "thick" when the printing paper size item is set to "postcard", is a print job related to test printing.

Accordingly, if the paper type is set to something other than thick when the paper size is set to postcard, it is determined that printing is test printing, so test printing can be performed without a complicated operation.

(viii) The recommended settings may include at least a combination in which the printing paper type item is set to photo paper when the printing paper size item is set to photo size, and the controller may determine that a print job that includes a setting in which the type item is set to something other than photo paper when the printing paper size item is set to photo size, is a print job related to test printing.

Accordingly, if the paper type is set to something other than photo paper when the paper size is set to photo size (for example, L or 2L), it is determined that printing is test printing, so test printing can be performed without a complicated operation.

(ix) The image-forming apparatus may further include an operator that receives a change of settings related to the print job, and registration and editing of the recommended settings, and if the settings of a print job determined to be related to the test printing are changed to a combination according to the recommended settings, the controller may determine that the print job is a normal print job.

Accordingly, test printing can be changed to normal printing without a complicated operation. A preferred aspect of the invention also includes combinations of any of the plurality of aspects described above.

Also, (x) an image-forming method according to the invention includes receiving and storing, by a processor, one or more combinations of a setting of another item with respect to a setting of one item, from among settings of a plurality of items related to a print job, as recommended settings, receiving a setting related to a print job, determining, on a basis of the received setting, whether to execute the print job as a print job related to test printing or execute the print job as a normal print job, and performing printing related to test printing or normal printing, on the basis of the determination, and, when making the determination, the processor determines that the print job is a print job related to test printing when the print job includes a setting of another item other than the recommended settings with respect to the setting of the one item.

In addition to the embodiments described above, various modified examples of the invention are also possible. Such modified examples should not be construed as being outside the scope of the invention. The invention is intended to include all modifications that are within the scope and meanings equivalent to the scope of the claims for patent.

What is claimed is:

1. An image-forming apparatus comprising:
a printer that performs printing; and
a controller that determines, on a basis of settings related to a print job, whether to execute the print job as a print job related to test printing or execute the print job as a normal print job, and causes the printer to perform printing,
wherein the settings related to the print job include a plurality of items, and one or more combinations of a setting of another item with respect to a setting of one item are set as recommended settings, and when the print job includes a setting of another item other than the recommended settings with respect to the setting of the one item, the controller determines that the print job is a print job related to test printing.

2. The image-forming apparatus according to claim 1, further comprising:

a notifier that notifies a user, wherein when it is determined that the print job is a print job related to test printing, the controller notifies the user, using the notifier, that the print job will be executed as a print job related to test printing.

3. The image-forming apparatus according to claim 2, further comprising:

an operator that receives an operation by the user relating to the print job, wherein when it is determined that the print job is a print job related to test printing, the controller notifies the user, using the notifier, as to whether to change the settings related to the print job to the recommended settings, receives an operation to change the print job to the recommended settings via the operator, and changes the settings related to the print job to the recommended settings when the operation is received.

4. The image-forming apparatus according to claim 3, wherein when it is determined that the print job is a print job related to test printing, the controller receives a setting of number of copies related to the test printing, and causes the notifier to notify the user of remaining number of copies during the test printing.

5. The image-forming apparatus according to claim 3, wherein after the print job related to test printing ends, the controller notifies the user, using the notifier, as to whether to change the settings related to the print job to the recommended settings, and receives an operation to change the print job to the recommended settings via the operator.

6. The image-forming apparatus according to claim 1, wherein the items include at least one of a size, type, and print quality of printing paper.

7. The image-forming apparatus according to claim 6, wherein the recommended settings include at least a combination in which the printing paper type item is set to "thick" when the printing paper size item is set to "postcard", and the controller determines that a print job that includes a setting in which the printing paper type item is set to something other than "thick" when the printing paper size item is set to "postcard", is a print job related to test printing.

8. The image-forming apparatus according to claim 6, wherein the recommended settings include at least a combination in which the printing paper type item is set to photo paper when the printing paper size item is set to photo size, and the controller determines that a print job that includes a setting in which the printing paper type item is set to something other than photo paper when the printing paper size item is set to photo size, is a print job related to test printing.

9. The image-forming apparatus according to claim 1, further comprising:

an operator that receives a change of settings related to the print job, and registration and editing of the recommended settings, wherein when the settings of a print job determined to be related to the test printing are changed to a combination related to the recommended settings, the controller determines that the print job is a normal print job.

10. An image-forming method comprising:

receiving and storing, by a processor, one or more combinations of a setting of another item with respect to a setting of one item, from among settings of a plurality of items related to a print job, as recommended settings;

receiving, by the processor, settings related to a print job;

determining, by the processor, whether to execute the print job as a print job related to test printing or execute the print job as a normal print job on a basis of the received setting; and performing, by the processor, printing related to test printing or normal printing on the basis of the determination, wherein in the determining, the processor determines that the print job is a print job related to test printing when the print job includes a setting of another item other than the recommended settings with respect to the setting of the one item.

* * * * *